United States Patent [19]

Köhler

[11] 4,256,498

[45] Mar. 17, 1981

[54] PROCESS FOR THE MANUFACTURE OF REFRACTORY WARE

[75] Inventor: Emil K. Köhler, Gro Balmerode, Fed. Rep. of Germany

[73] Assignee: Bibrach & Rehberg, Goettingen, Fed. Rep. of Germany

[21] Appl. No.: 939,799

[22] Filed: Sep. 5, 1978

[30] Foreign Application Priority Data

Sep. 3, 1977 [DE] Fed. Rep. of Germany ....... 2739722
Jul. 27, 1978 [DE] Fed. Rep. of Germany ....... 2832946

[51] Int. Cl.$^3$ ............................................. C04B 33/32
[52] U.S. Cl. ...................................... 106/55; 264/57; 264/64
[58] Field of Search ...................... 264/57, 64; 106/55

[56] References Cited

U.S. PATENT DOCUMENTS 4,102,961  7/1978  Cremer .................................. 264/57

OTHER PUBLICATIONS

Singer, *Industrial Ceramics,* p. 885 (1963).

*Primary Examiner*—John Parrish
*Attorney, Agent, or Firm*—Miller & Prestia

[57] ABSTRACT

Large size (over 150 kg) ware which has to be fired in a kiln to form refractory ware is surrounded by muffling or upright lattice work in order to maintain a substantially uniform temperature gradient around the ware during firing in the kiln and during part of the cooling-down phase. The kiln used is a tunnel kiln and other ware to be fired may form the muffling or lattice work.

7 Claims, No Drawings

PROCESS FOR THE MANUFACTURE OF REFRACTORY WARE

The invention relates to a process for burning large-size ware to give refractory products, such as, for example, bricks of a weight of more than 150 kg and of wall thicknesses of 200 mm and greater, in a kiln, using kiln firing.

The properties of refractory products, in particular refractory bricks, are influenced by the manufacturing conditions in addition to the raw materials themselves, which are employed. To obtain the requisite physical properties of such products, the burning process is an essential parameter. For example, the strength, the porosity, the density, the hot-bending strength, the compressive strength and the creep behaviour are determined or influenced by the selection of firing curves of corresponding firing period and firing temperature. Moreover, the firing process initiates reactions which decisively alter the mineralogical composition. Inter alia, in addition to the thermal expansion as a function of the temperature, expansion effects or shrinkage effects which can lead to considerable strains and pressures within the texture of the refractory products, occur during these reactions as the result of new crystallisations and recrystallisations.

The processes take place at diverse temperature ranges and some of them proceed but some of them take a prolonged time. In addition, as a function of the brick thickness and the heat conductivity of the refractory bricks, a greater or lesser pronounced temperature gradient is present between the outer layer and the core of the brick during firing. Disregard of this knowledge in controlling the firing of the kiln has, results in the refractory products being destroyed by the formation of cracks, usually in the heating zone or in the cooling zone.

To prevent this, refractory products are fired in diverse types of kiln depending on the grade and also the size, thickness and weight. Essentially there are two distinct kiln types or firing processes. In one process, the ware is stationary within the kiln, while the kiln moves during firing; annular chamber kilns are an example of this. However, the so-called single kilns, bell-type kilns, bogie hearth kilns and the like in principle also belong to this type with the ware being stationary. In the other process, the firing kiln is stationary, while the ware is moved or processed through the kiln. The main type employed for this process is the tunnel kiln.

It is known that, firing processes can be carried out more economically in tunnel kilns. The advantage of a single kiln is its greater flexibility with respect to the firing temperatures, the firing time and the firing control in all temperature ranges. The disadvantage of a single kiln is that the kiln is occupied for a relatively long period by one firing process or is not available for other firing processes. Anyhow, in this case, the ware must first be introduced into the cold kiln. The firing process takes place subsequently. Even during the cooling phase, the single kiln cannot be used. Finally, the ware must be removed from the cooled kiln. The considerable stresses as well as damage to the masonry of single kilns of this type, due to the change in temperature, are a further disadvantage.

Hitherto, large-size ware was fired to refractory products only in annular chamber kilns or single kilns, that is to say kilns in which the ware was stationary. Large-size ware or refractory products fired therefrom are understood as a ware which has a weight of more than 150 kg and in which wall thicknesses of 200 mm and greater are present, that is to say, for example, tank blocks, bench slabs and similar structures. It has only been possible to carry out the firing process of such large-size products in the annular chamber kiln or in the single kiln, because, with these kiln types, the heating-up process, the finish-burning time and the cooling-down process can be controlled with respect to time and temperature in such a way that the reactions described do not lead to those states of strain which would result in destruction of the products. As a disadvantage, however, poor economics are associated with this process.

It is already known from Singer "Die Keramik im Dienste von Industrie and Volkswirtschaft (Ceramics as a Service to Industry and the National Economy)", Brunswick, 1923, page 876, section 2 et seq., to build muffles into the cavity of a kiln in such a way that the hot flue gases can flow around the muffle walls and heat them. It is also possible for the muffles to be built up from individual elements, plates or tiles, which interlock at their adjoining edges with the aid of suitable beads and thus ensure the tightest possible joint. Such a kiln, equipped with stationary muffling, can be regarded as a precursor of the tunnel kiln. It is also known from the same publication to surround small-size wares with muffling which then progresses through the kiln together with the ware. However, the heat transfer condition in the case of small-size ware are entirely different from those in the case of large-size ware, where considerable temperature differences between the surface and the core are generated and lead to the formation of cracks due to the strains. For this reason, the tunnel kiln is suitable as high-performance burning equipment only for the burning of small-size ware which can be put through quickly. All those skilled in the art are convinced that the tunnel kiln is unsuitable for firing large-size ware, in particular because of the difficult heating-up and cooling-down conditions which in the tunnel kiln would lead to the occurrence of thermal strains in large-size ware and hence to formation of cracks and destruction. The necessary evening-out of the firing conditions with respect to flow and temperature, such as can be attained in the single kiln, is not possible in the tunnel kiln. It is therefore an object of the invention to avoid the disadvantages of the state of the art and to indicate a process for firing large-size ware to give refractory products, which process operates more economically than the firing process using annular chamber kilns or single kilns. The point is to exploit the economic advantages of the tunnel kiln in burning large-size ware.

According to the invention there is achieved a process for burning ware of a size greater than 150 kg and having a wall thickness greater than 200 mm to form refractory products, which comprises progressing the ware through a tunnel kiln and surrounding the ware with heat-resistant muffling or upright lattice work to maintain a substantially temperature gradient, around the ware.

In the process according to the invention it is possible, using muffling or lattice-work, to achieve an evening-out of the influences of the temperature and hence, surprisingly, to eliminate the formation of cracks, caused by heating-up and cooling-down strains. It is merely necessary to ensure that the action of the kiln firing on the ware is largely or completely indirect so that still conditions are provided around the ware, where the action of temperature can take place in such a way that the ware is uniformly subjected to firing in spite of a large wall thickness. Temperature gradients cannot be entirely eliminated. Using the process according to the invention, it is possible however, to maintain such small temperature differences that they do not have a noticeable adverse effect. An essential advantage of the process is that the large-size ware such as, for example, tank blocks, bench slabs and similar structures, can be passed through the tunnel kiln at the same linear speed as small-size ware. It is thus not necessary to interrupt the kiln passage through the tunnel kiln when large-size ware is burnt, even if the next ware pushed pressing through the kiln is of small size. The muffling is lowered onto the kiln bogie after the large-size ware has been placed thereon. The muffling is intended to surround the large-size ware to an extent that it protects it from adverse draught conditions. It is not essential that the muffling wholly surrounds the large-size ware on the kiln bogie.

The cooling-down phase at the end of the burning process is also carried out with retention of the heat-resistant muffling or upright lattice work. This applies at least for a part of the cooling-down. Although this prolongs the cooling-down phase, this is of no importance for the economics of the kiln since, during this cooling-down phase, the tunnel kiln is already in use again for firing other ware.

The manner of placing the large-size ware, the control of the tunnel kiln in the individual zones of kiln firing and the linear speed of the ware through the kiln are adjusted as desired. The adjustment of these individual conditions can be found and determined by trials and will depend on the type and the shape of the large-size ware which is to be burnt.

The economics of the process can yet be further improved when raw unfired mouldings, which are fired to refractory bricks during the kiln passage, are used as muffling or upright lattice work. In this way, the entire space on a kiln bogie is utilised for firing. The raw unfired mouldings are also fired so that the muffling or upright lattice work, which is meant as a firing auxiliary for the large-size ware, itself represents a fired product and hence a saleable product. Compared with the firing of large-size ware in a single kiln, where a firing period of about 14 days is required, the firing period in the tunnel kiln is not only shortened to about 5 days but the individual kiln bogie is also utilised to the optimum with respect to its available space.

The firing temperatures of the raw unfired mouldings are adapted to the large-size ware to be fired, having regard to the nature of the material, the size, the manner of placing, the compatibility and the like. In general, it is advantageous for the firing temperature of the raw unfired ware to be about 50° C.—corresponding to two Seger cones—higher than the firing temperature of the large-size ware. During the firing of the large-size ware in the zone of the muffling or upright lattice work, temperatures which are about 50° C. higher prevail in the tunnel kiln so that it is thus possible to maintain both the firing temperature for the larger-size ware and firing for the refractory bricks.

I claim:

1. In a process for burning ware of a size greater than 150 kg and having a wall thickness greater than 200 mm to form refractory products, the improvement which comprises processing the ware through a tunnel kiln and surrounding the ware with heat-resistant muffling or upright lattice work so as to maintain a substantially uniform temperature gradient around the ware.

2. A process according to claim 1, in which heat-resistant or upright lattice work is maintained around the ware during the cooling-down phase.

3. Process according to claims 1 or 2, in which the manner of placing the ware in the kiln, the temperature control in the zones of kiln firing and the linear speed of the ware through the kiln are adjusted to the indirect action of kiln firing on the ware.

4. A process according to claim 1, in which raw unfired mouldings, are used as the muffling or upright lattice work and thus become fired refractory bricks.

5. A process according to claim 4, in which to the firing temperature of the raw unfired mouldings is adapted to the large-size ware to be fired.

6. Process according to claim 5, in which the firing temperature of the raw unfired ware is about 50° C. higher than the firing temperature of the large-size ware.

7. Refractory ware when made according to the process of claim 1.

* * * * *